United States Patent
Ahukanna et al.

(10) Patent No.: US 10,049,554 B1
(45) Date of Patent: Aug. 14, 2018

(54) CABLE SUSPENSION DETECTION

(71) Applicant: International Business Machines Corporation, Armonk, NY (US)

(72) Inventors: Dawn N. Ahukanna, Munich (DE);
Fraser I. MacIntosh, Reading (GB);
Laura F. Storey, Eastleigh (GB);
Dominik Ullmann, Southampton (GB);
Matthew J. Warren, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/592,360

(22) Filed: May 11, 2017

(51) Int. Cl.
G08B 21/00 (2006.01)
G08B 21/18 (2006.01)
G01V 7/06 (2006.01)
G01P 15/00 (2006.01)
G01D 5/12 (2006.01)

(52) U.S. Cl.
CPC ............ *G08B 21/182* (2013.01); *G01D 5/12* (2013.01); *G01P 15/00* (2013.01); *G01V 7/06* (2013.01)

(58) Field of Classification Search
CPC ......... G08B 21/182; G01D 5/12; G01P 15/00; G01V 7/06
USPC ...................................................... 340/686.6
See application file for complete search history.

(56) References Cited

U.S. PATENT DOCUMENTS

| | | | |
|---|---|---|---|
| 8,437,979 B2 | 5/2013 | Frank et al. | |
| 9,019,508 B2 | 4/2015 | Blacklaw | |
| 9,316,481 B2 | 4/2016 | Lee et al. | |
| 9,376,906 B2 | 6/2016 | Dalvi et al. | |
| 2007/0257017 A1* | 11/2007 | Deangelis | H05B 1/0272 219/211 |
| 2008/0099313 A1* | 5/2008 | Dhir | H01R 13/7175 200/51.12 |
| 2008/0300821 A1* | 12/2008 | Frank | G01V 1/201 702/150 |
| 2010/0296100 A1 | 11/2010 | Blacklaw | |
| 2012/0016538 A1* | 1/2012 | Waite | G01C 21/20 701/3 |

(Continued)

FOREIGN PATENT DOCUMENTS

CN 204856174 U 12/2015

OTHER PUBLICATIONS

IBM, List of IBM Patents or Patent Applications Treated as Related, Appendix P, dated Oct. 3, 2017, 2 pages.

(Continued)

*Primary Examiner* — Kerri McNally
*Assistant Examiner* — Thang Tran
(74) *Attorney, Agent, or Firm* — Tihon Poltavets

(57) ABSTRACT

An apparatus for an embedded sensor cable assembly, where a first cable assembly includes a cable portion and a connector portion. The cable portion includes a first embedded sensor and a second embedded sensor, where the first embedded sensor is electrically coupled to the second embedded sensor and where the first embedded sensor and the second embedded sensor is capable of registering orientation measurements. A microcontroller is electrically coupled to the connector portion, first embedded sensor and the second embedded sensor, where the microcontroller is capable of receiving the orientation measurements from the first embedded sensor and the second embedded sensor.

12 Claims, 5 Drawing Sheets

(56) References Cited

U.S. PATENT DOCUMENTS

| | | | |
|---|---|---|---|
| 2012/0084231 A1* | 4/2012 | McNaught | G06Q 10/06 |
| | | | 705/400 |
| 2012/0197589 A1* | 8/2012 | Kansala | H02G 7/04 |
| | | | 702/141 |
| 2014/0064389 A1* | 3/2014 | Van Fleet | G01S 13/10 |
| | | | 375/257 |
| 2014/0123750 A1* | 5/2014 | Liu | G01W 1/02 |
| | | | 73/170.17 |
| 2015/0215684 A1* | 7/2015 | Kauffman | H04Q 9/00 |
| | | | 340/870.16 |
| 2015/0226585 A1* | 8/2015 | Yang | G01D 11/245 |
| | | | 73/431 |
| 2016/0088707 A1* | 3/2016 | Van De Sluis | H05B 37/0227 |
| | | | 315/149 |
| 2016/0139353 A1* | 5/2016 | Bauco | G02B 6/447 |
| | | | 356/73.1 |
| 2016/0258783 A1* | 9/2016 | Howley | G01D 5/24452 |
| 2016/0356863 A1 | 12/2016 | Boesch et al. | |
| 2017/0131424 A1 | 5/2017 | Olsson | |
| 2017/0249417 A1 | 8/2017 | Gosieski et al. | |
| 2017/0309152 A1 | 10/2017 | Dinkins | |

OTHER PUBLICATIONS

Pending U.S. Appl. No. 15/722,263, filed Oct. 2, 2017, entitled: "Cable Suspension Detection", 30 pages.

Jian et al., "Multi-rope Hoist Steel Rope Tension On-line Monitoring System", National Conference on Information Technology and Computer Science (CITCS 2012), pp. 229-232, © 2012, The authors—Published by Atlantis Press.

* cited by examiner

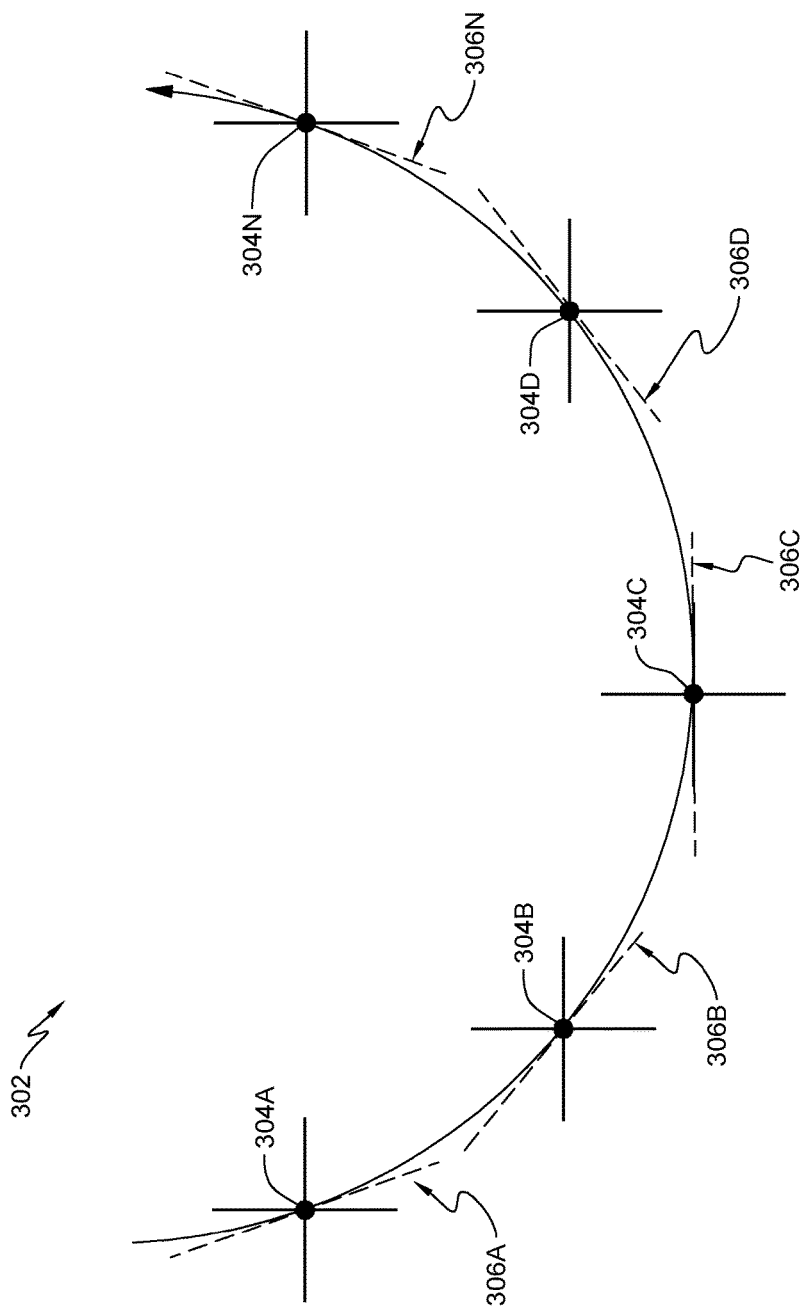

CABLE SUSPENSION DETECTION

FIELD OF THE INVENTION

This disclosure relates generally to cable management, and in particular, to determining a shape of a cable.

BACKGROUND OF THE INVENTION

In certain instances, suspension of cable structures can result in health and safety issues. For example, a cable suspended between two points can shift outside operational bounds due to external forces, such as heavy wind or inadvertent contact. Subsequently, the cable suspended outside the operational bounds can pose a risk to individuals in a vicinity of the cable or to other equipment connected to the cable. The shifting of the cable suspended between two points outside operational bounds may not become apparent to an individual monitoring the cable due to the progressiveness of the shifting cable.

SUMMARY

One aspect of an embodiment of the present invention discloses an apparatus for an embedded sensor cable assembly, the apparatus comprising, a first cable assembly, wherein the first cable assembly includes a cable portion and a connector portion; the cable portion includes a first embedded sensor and a second embedded sensor, wherein the first embedded sensor is electrically coupled to the second embedded sensor, and wherein the first embedded sensor and the second embedded sensor is capable of registering orientation measurements; and a microcontroller electrically coupled to the connector portion, first embedded sensor, and the second embedded sensor, wherein the microcontroller is capable of receiving the orientation measurements from the first embedded sensor and the second embedded sensor.

A second aspect of an embodiment of the present invention discloses a method comprising, determining, by one or more processors, a first base reading corresponding to a first sensor and a second base reading corresponding to a second sensor, wherein the first sensor and the second sensor are embedded on a cable portion of a cable assembly; responsive to receiving a first reading corresponding to the first sensor and a second reading corresponding to the second sensor, determining, by one or more processors, whether a cable placement of the cable portion of a cable assembly is outside a safety limit; and responsive to determining the cable placement of the cable portion of the cable assembly is outside the safety limit, sending, by one or more processors, an alert.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which:

FIG. 3 depicts an example of sensor output patterns for determining cable placement, in accordance with one embodiment of the present invention.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

Figure 1:
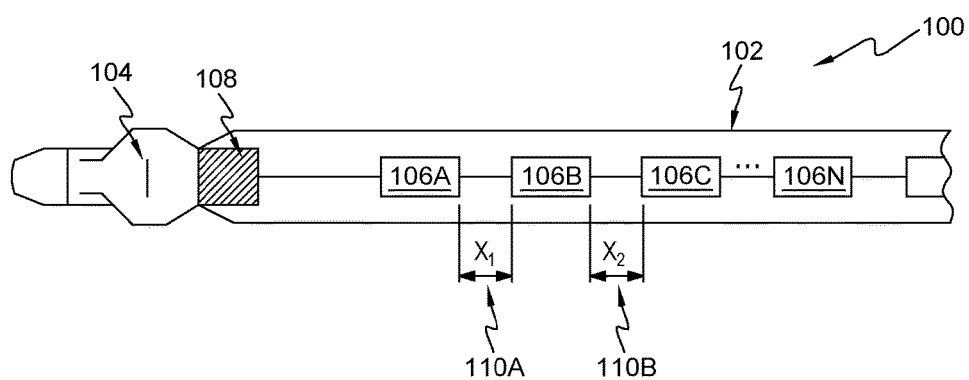
FIG. 1 depicts a cable with sensor configuration, in accordance with an embodiment of the present invention.

FIG. 1 depicts a cable with sensor configuration, in accordance with an embodiment of the present invention. In this embodiment, cable assembly 100 includes cable portion 102 and connector 104. Cable portion 102 represents any cable such as a twisted pair, fiber optic, coaxial, patch, power lines, hybrid fiber-coaxial, Power over Ethernet (PoE), and any other known cables in the art. Connector 104 represents any electrical connector capably of supplying electrical current to cable portion 102 of cable assembly 100. Cable portion 102 further includes embedded sensors 106A, 106B, 106C, and 106N electrically connected (i.e., coupled) to embedded microcontroller 108. Embedded sensor 106N represents an embedded sensor situated further along cable portion 102 of cable assembly 100, for example, the $10^{th}$ or the $20^{th}$ embedded sensor.

In this embodiment, embedded sensors 106A, 106B, 106C, and 106N are arranged in series along cable portion 102 of cable assembly 100. In an alternative embodiment, not illustrated in FIG. 1, embedded sensors 106A, 106B, 106C, and 106N can be arranged in parallel to prevent a single embedded sensor failure from affecting the remaining embedded sensors. In this embodiment, embedded sensors 106A, 106B, 106C, and 106N represent orientation sensors capable of registering various ranges of orientation and motions utilizing a 3-axis accelerometer, 3-axis gyroscope, and 3-axis magnetometer (i.e., 9 Degrees of Freedom). In other embodiments, embedded sensors 106A, 106B, 106C, and 106N utilize any combination of a 3-axis accelerometer, 3-axis gyroscope, and 3-axis magnetometer to register various ranges of orientation and motion readings. Embedded sensors 106A, 106B, 106C, and 106N can each register values at set time intervals to allow for microcontroller 108 to determine cable placement for cable portion 102 of cable assembly 100, which is discussed in further detail in FIG. 5.

Embedded sensor 106A and embedded sensor 106B are electrically connected (i.e., coupled) and separated by distance 110A (i.e., $X_1$). Embedded sensor 106B and embedded sensor 106C are electrically connected (i.e., coupled) and separated by distance 110B (i.e., $X_2$). In this embodiment, distance 110A separating embedded sensor 106A and 106B is equal to distance 110B separating embedded sensor 106B and 106C (i.e., $X_1=X_2$). Additionally, any subsequent embedded sensor (e.g., embedded sensor 106N) is electrically coupled to a previous embedded sensor along cable portion 102, at a distance (i.e., $X_N$) equal to distance 110A and 110B (i.e., $X_1=X_2=X_N$). In another embodiment, cable portion 102 can include a higher concentration of embedded sensors in areas of cable portion 102 experiencing smaller variations in orientation. For example, there may be a higher concentration of embedded sensors near connector 104, where a distance between each embedded sensor increases which embedded sensors further down the length of cable portion 102 (i.e., towards embedded sensor 110N).

Microcontroller 108 is able to send and receive information from embedded sensors 106A, 106B, 106C, and 106N. In one example, microcontroller 108 can receive orientation and motion information from embedded sensors 106A, 106B, 106C, and 106N, where the orientation and motion information includes gravitational force (i.e., g-force) measurements and acceleration measurements. In another example, microcontroller 108 can receive information from embedded sensors 106A, 106B, 106C, and 106N, where the information can include any combination of gravitational force measurements, acceleration measurements, and magnetism measurements. Connector 104 provides a path to query and control microcontroller 108, along with embedded sensors 106A, 106B, 106C, and 106N. Furthermore, microcontroller 108 has the ability to send information received from embedded sensors 106A, 106B, 106C, and 106N to a client device or cable management program 410, discussed in further detail in FIG. 4.

Microcontroller 108 has the ability to utilize base measurements for embedded sensors 106A, 106B, 106C, and 106N and monitor current measurements from embedded sensors 106A, 106B, 106C, and 106N, to determine if any of the current measurements exceeded a pre-determined threshold. For example, if embedded sensor 106A includes a base measurement of "0", microcontroller 108 can utilize a "+/−0.5" threshold to determine when current measurements exceed specific limitation of cable assembly 100. For discussion purposes, "+0.5" represents an upper bound of the threshold and "−0.5" represents a lower bound of the threshold, where "1" represents a total range of the threshold. The pre-determined threshold takes into account any cable movements that would be deemed insignificant, for example, due to light winds that would not cause cable assembly 100 to be suspended in a dangerous manner. Additionally, microcontroller 108 can take into account situations where a single embedded sensor (e.g., embedded sensor 106B) has failed when the single embedded sensor is sending measurements outside the pre-determined threshold. Microcontroller 108 can determine if embedded sensors (e.g., embedded sensor 106A and 106C) surrounding the single embedded sensor (e.g., embedded sensor 106B) are sending measurements outside the pre-determined threshold. If embedded sensor 106A and 106C each send measurements within the pre-determined threshold, then embedded sensor 106B has failed. If at least one of embedded sensor 106A and 106C sends measurements outside the bounds of the pre-determined threshold, then embedded sensor 106B has not failed and the cable has been improperly suspended.

Figure 2A:
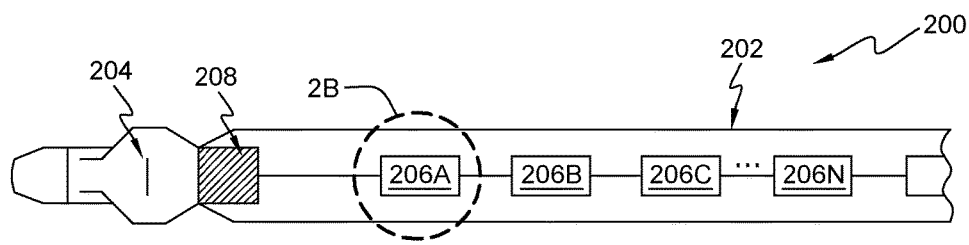
FIG. 2A depicts a cable with sensor and indicator configuration, in accordance with one embodiment of the present invention.

FIG. 2A depicts a cable with sensor and indicator configuration, in accordance with one embodiment of the present invention. In this embodiment, cable assembly 200 includes cable portion 202 and connector 204. Connector 204 represents any electrical connector capably of supplying electrical current to cable portion 202 of cable assembly 200. Cable portion 202 further includes embedded components 206A, 206B, 206C, and 206N electrically connected (i.e., coupled) to embedded microcontroller 208. In this embodiment, embedded components 206A, 206B, 206C, and 206N are arranged in series along cable portion 202 of cable assembly 200, where each embedded component (e.g., embedded component 206A) includes a light-emitting diode (e.g., LED 210A) and an embedded sensor (e.g., embedded sensor 212A), discussed in further detail in FIG. 2A.

Figure 2B:
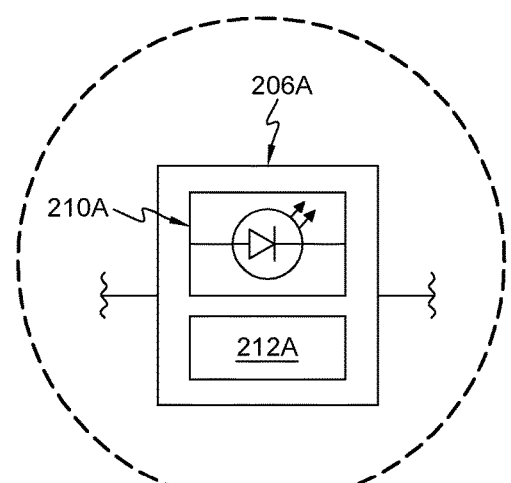
FIG. 2B depicts a single sensor and LED combination for the cable of FIG. 2, in accordance with one embodiment of the present invention.

FIG. 2B depicts a single sensor and LED combination for the cable of FIG. 2, in accordance with one embodiment of the present invention. In this embodiment, embedded component 206A from FIG. 2A includes LED 210A and embedded sensor 212A, where LED 210A is electrically coupled to embedded sensor 212A. In another embodiment, LED 210A operates on a circuit independent from embedded sensor 212A. Microcontroller 208 has the ability to provide a visual indicator, for example, via LED 210A on cable portion 202 when cable assembly 200 has been suspended in a manner outside a pre-determined threshold. In the event cable assembly 200 has been suspended in a manner outside a pre-determined threshold, microcontroller 208 can activate the LEDs, including LED 210A along cable portion 202 to indicate that cable assembly 200 is currently improperly suspended. A color of the activated LEDs along cable portion 202 can act as the visual indicator of whether cable assembly 200 is properly suspended. For example, if the activated LEDs are red in color, then cable assembly 200 is currently improperly suspended and if the activated LEDs are green in color, then cable assembly 200 is currently properly suspended. Additionally, LED 210A can act as a visual indicator if embedded sensor 212A fails. For example, in the event microcontroller 208 determines that embedded sensor 212A has failed, microcontroller 208 can activate LED 210A in an orange color.

FIG. 3 depicts an example of sensor output patterns for determining cable placement, in accordance with one embodiment of the present invention. In this example, cable portion 302 is suspended in a parabolic manner. Embedded sensor 304A, 304B, 304C, 304D, and 304N are located along cable portion 302 of a cable assembly. Embedded sensor 304N represents an embedded sensor situated further along cable portion 302 of the cable assembly, for example, the $10^{th}$ or the $20^{th}$ embedded sensor. Embedded sensors 304A, 304B, 304C, 304D, and 304N each produce measurement readings for an angle that each embedded sensor is currently tilted around its respective axes. A microcontroller can compile this information and determine a cable placement of cable portion 302 of the cable assembly based on known distances between each of the embedded sensors (e.g., distance between embedded sensor 304B and embedded sensor 304C). In this example, embedded sensor 304A produces a −80 degree rotational angle, embedded sensor 304B produces a −50 degree rotational angle, embedded sensor 304C produces a 0 degree rotation angle, embedded sensor 304D produces a 50 degree rotational angle, and embedded sensor 304N produces an 80 degree rotational angle. Tangent line 306A, 306B, 306C, 306D, and 306N each represent the degree rotational angles for embedded sensor 304A, 304B, 304C, 304D, and 304N, respectively.

Additionally, various embodiments are not limited to a spatial visualization of the cable placement of the cable assembly based on a deviation from a base value (e.g., 0) for each of the embedded sensors. For example, in scenarios where the cable assembly experiences an occurring motion, the microcontroller may not be able to establish base values for each of the embedded sensors. The microcontroller can determine the spatial visualization of the cable placement of the cable assembly by compiling orientation information from each of the embedded sensors and determining the cable placement based on a relationship between the compiled orientation information from each of the embedded sensors. The orientation information from each embedded sensor represents a segment of the cable assembly for which the microcontroller compiles into creating the spatial visualization of the cable placement of the cable assembly.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of an embedded sensor cable assembly (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

Figure 4:
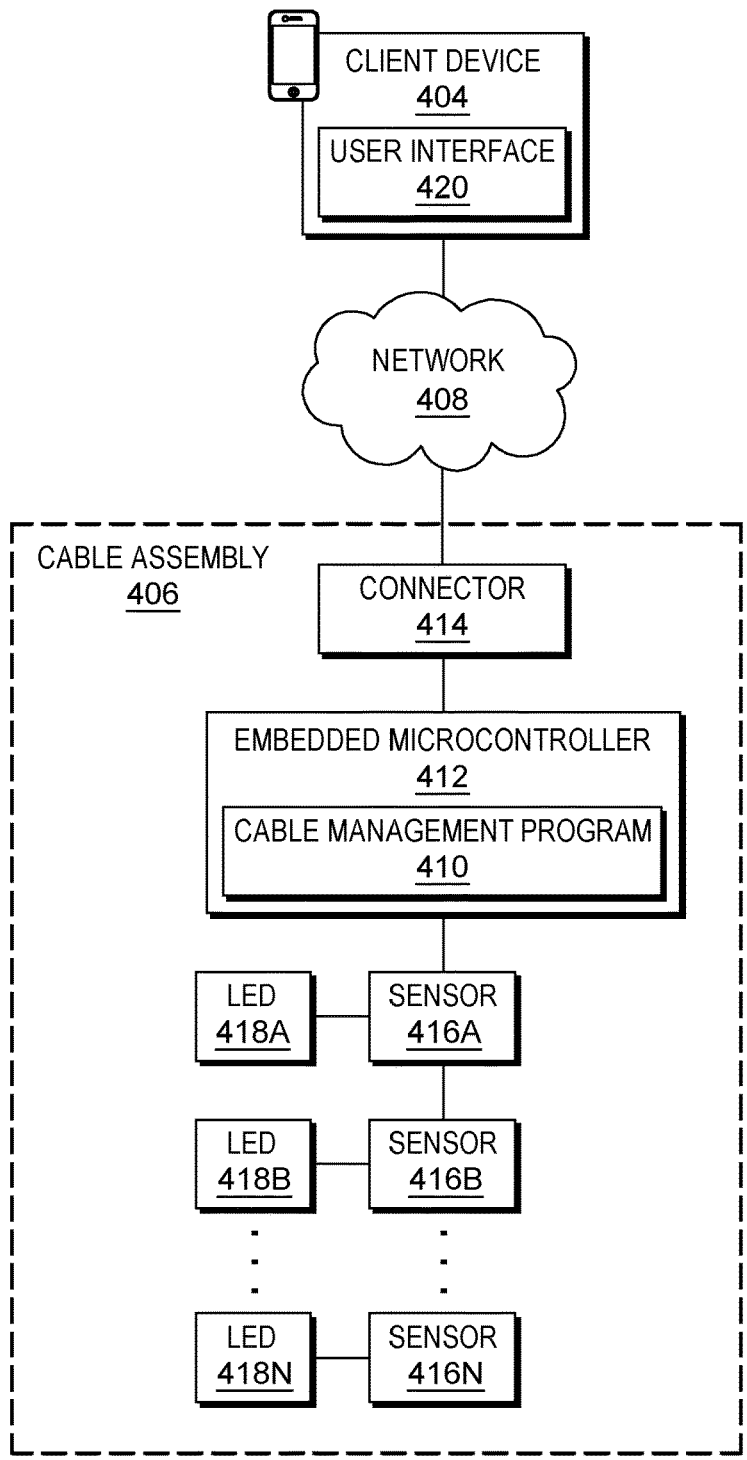
FIG. 4 is a functional block diagram illustrating a distributed data processing environment, in an embodiment, in accordance with the present invention.

FIG. 4 is a functional block diagram illustrating a distributed data processing environment, in an embodiment in accordance with the present invention. The distributed data processing environment includes client device 404 and cable assembly 406, all interconnected over network 408.

Client device 404 may be a laptop computer, tablet computer, netbook computer, personal computer (PC), personal digital assistant (PDA), smart phone, wearable device (e.g., smart watch, personal fitness device, personal safety device), or any programmable computer system known in the art with an interactive display. Client device 404 includes user interface 420 and may include a client based cable management program 410, not illustrated in FIG. 4. In general, client device 404 is representative of any programmable electronic device or combination of programmable electronic devices capable of executing machine-readable program instructions and communicating with users of other electronic devices via network 408. Client device 404 may include components, as depicted and described in further detail with respect to FIG. 6, in accordance with embodiments of the present invention.

Cable assembly 406 includes embedded microcontroller 412 and connector 414, where connector 414 allows for sending and receiving of information between embedded microcontroller 412 and client device 404. Embedded microcontroller 412 is electrically connected to sensor 416A, 416B, and 416N and is capable of receiving measurement readings from sensor 416A, 416B, and 416N. Sensor 416A, 416B, and 416N each include LED 418A, 418B, and 418N, respectfully. In this embodiment, LED 418A, 418B, and 418N represent visual indicators, which can alert individuals in a vicinity of cable assembly 406 if cable placement of cable assembly 406 is outside the safety limits. Sensor 416N and LED 418N represents an embedded sensor and LED situated further along a cable portion of cable assembly 406, for example, the $10^{th}$ or the $20^{th}$ embedded sensor.

Embedded microcontroller 412 includes cable management program 410 for determining cable placement, where the cable is being suspended between two points. Cable management program 410 has the ability to establish a base placement for the cable being suspended by determining base readings for each embedded sensor along a cable portion of the cable assembly. Subsequent to establishing base reading, cable management program 410 can receive readings from the embedded sensors and determine cable placement based on the readings from the embedded sensors. Cable management program 410 can determine whether the cable placement of the cable assembly is outside the safety limits and send an alert subsequent to determining the cable placement of the cable assembly exceeds the safety limits. In an alternative embodiment, microcontroller 412 includes the above-discussed steps of cable management program 410 in the form of control logic.

Client device 404 also includes user interface (UI) 420 and various programs (not shown). Examples of the various programs on client device 404 include: a web browser, an e-mail client, security software (e.g., a firewall program, a geo-locating program, an encryption program, etc.), an instant messaging (IM) application (app), and a communication (e.g., phone) application. In an example, a user of client device 404 can interact with user interface 420, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 420 operating within the GUI of client device 404. User interface 420 accepts input from a plurality of input/output (I/O) devices including, but not limited to, a tactile sensor interface (e.g., a touch screen, a touchpad) referred to as a multi-touch display. An I/O device interfacing with user interface 420 may be connected to client device 404, which may operate utilizing wired (e.g., USB port) or wireless network communications (e.g., infrared, NFC, etc.).

In general, network 408 can be any combination of connections and protocols that will support communications between client device 404 and cable assembly 406. Network 408 can include, for example, a local area network (LAN), a wide area network (WAN), such as the internet, a cellular network, or any combination of the preceding, and can further include wired, wireless, and/or fiber optic connections. In one embodiment, cable management program 410 can be a web service accessible via network 408 to a user of client device 404.

Figure 5:
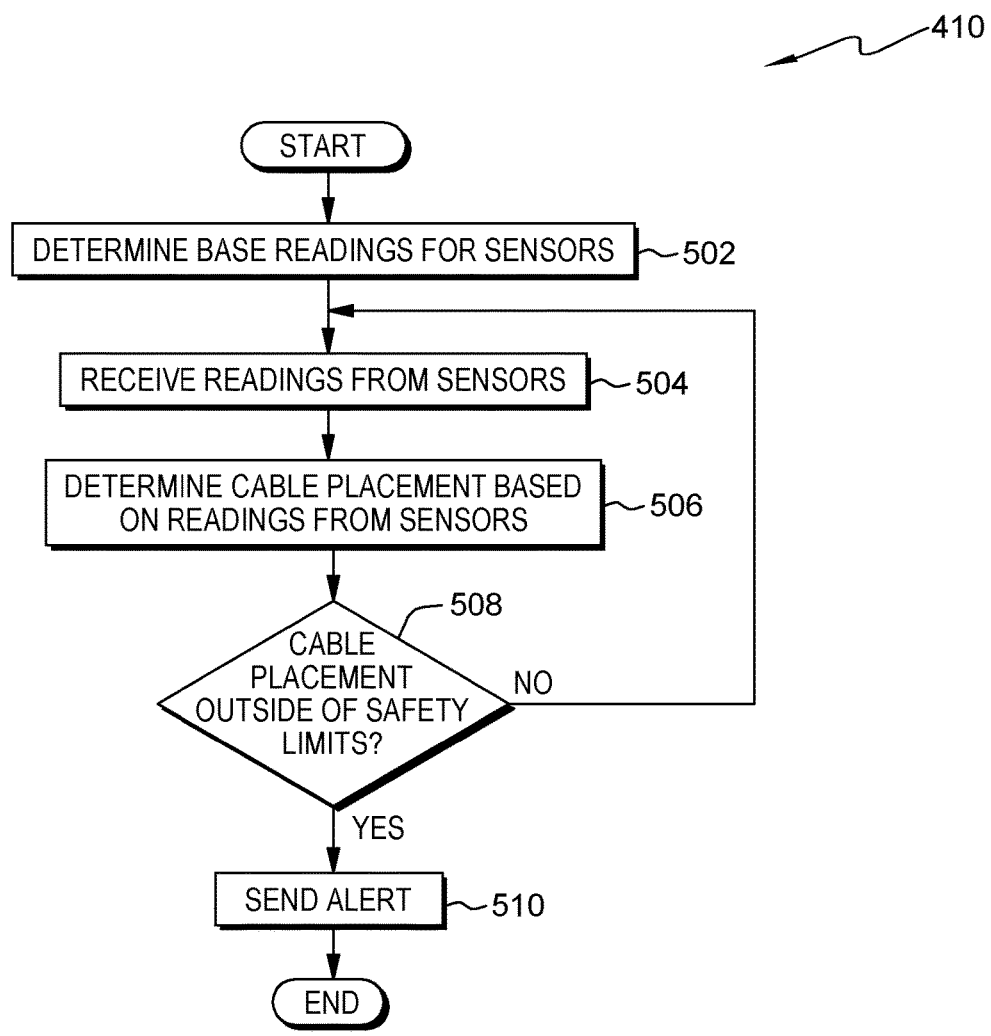
FIG. 5 is a flowchart depicting operational steps of a cable management program for determining cable placement, in accordance with one embodiment of the present invention.

FIG. 5 is a flowchart depicting operational steps of a cable management program for determining cable placement, in accordance with one embodiment of the present invention.

Cable management program 410 determines base readings for sensors (502). In this embodiment, cable management program 410 determines base measurement readings for each sensor embedded in a cable portion of the cable assembly. Once a cable assembly is placed into a suspended position, for example, between point A and point B, cable management program 410 can query a microcontroller on the cable assembly to determine base measurement readings for each sensor embedded in the cable portion of the cable assembly and receive the set base measurement readings from the microcontroller. In this embodiment, cable management program 410 determines base measurement reading for each sensor. For example, the determined measurements for the cable assembly suspended between point A and B can include the values, "−6, −4, −2, −1, 0, 0, +1, +2, +4, +6". In another embodiment, cable management program 410 calculates a slope between each of the sensors based on a length of a cable portion of the cable assembly, the spacing between each of the embedded sensors, and the measurement readings from each of the sensors.

Cable management program 410 receives readings from sensors (504). In this embodiment, cable management program 410 receives measurement readings from each sensor embedded in the cable portion of the cable assembly in pre-determined intervals. For example, cable management program 410 can receive measurement readings from each sensor in 5-second intervals. An administrative user of cable management program 410 has ability to set the pre-determined interval via a user interface (e.g., user interface 420) on a client device (e.g., client device 404). In addition to received measurement readings from each sensor, each received measurement reading can include an associated time stamp. The measurement readings can include information such as, gravitational force measurements, acceleration measurements, and magnetism measurements.

Cable management program 410 determines cable placement based on readings from sensors (506). In this embodiment, cable management program 410 determines cable placement of the cable portion of the cable assembly based orientation and motion information. The orientation and motion information is based on the gravitational force measurements, acceleration measurements, and magnetism measurements that the embedded microcontroller (e.g., embedded microcontroller 412) receives at set time intervals. In another embodiment, cable management program 410 determines cable placement of the cable portion of the cable assembly based on slope calculations between sensors embedded in the cable portion. Based on a length of a cable portion of the cable assembly, the spacing between each of the embedded sensors, and the measurement readings from each of the embedded sensors, cable management program 410 can utilize the readings received from the microcontroller to determine a slope between two embedded sensors. Cable management program 410 can calculate a slope between a first sensor and a second sensor, the second sensor and a third sensor, the third sensor and a fourth sensor, and so on for all remaining sensors in the cable portion of the cable assembly. Cable management program 410 compiles the determined slopes and determines the cable placement of the cable assembly. A visual representation of determining the cable placement of the cable assembly is illustrated in FIG. 3.

Cable management program 410 determines whether cable placement is outside the safety limits (508). In the event, cable management program 410 determines the cable placement is outside the safety limits ("yes" branch, 508), cable management program 410 sends an alert (510). In the event cable management program 410 determines the cable placement is not outside the safety limits ("no" branch, 508), cable management program 410 reverts back to receiving readings from sensors (504).

In this embodiment, cable management program 410 utilizes a pre-determined threshold for determining whether cable placement is outside the safety limits. For example, if embedded sensor 106A includes a base measurement reading of "0", cable management program 410 can utilize a "+/−0.5" threshold to determine when current measurement readings exceed specific limitation of the cable assembly. For discussion purposes, "+0.5" represents an upper bound of the threshold and "−0.5" represents a lower bound of the threshold, where "1" represents a total range of the threshold. The pre-determined threshold takes into account any cable movements that would be deemed insignificant, for example, due to light winds that would not cause cable assembly 100 to be suspended in a dangerous manner. In the event two or more sensors register measurement readings outside the lower bound of the threshold and the upper bound of the threshold, cable management program 410 determines the cables place is outside the safety limits. In the event no sensor registers measurement readings outside the lower bound of the threshold and the upper bound of the threshold, cable management program 410 determines the cables place is not outside the safety limits. In the event a single sensor registers measurement readings outside the lower bound of the threshold and the upper bound of the threshold, cable management program 410 determines the single sensor is faulty due to a sensor located fore and a sensor located aft relative to the single sensor, not registering measurement readings outside the lower bound of the threshold and the upper bound of the threshold.

Cable management program 410 sends an alert (510). In this embodiment, cable management program 410 sends an alert by activating a visual indicator (e.g., LED) associated with each sensor embedded on the cable portion of the cable assembly. Cable management program 410 can utilizes various colors to indicate whether or not the cable placement is outside the safety limits. For example, green can indicate that the cable placement is not outside the safety limits, while red can indicate that the cable placement is outside the safety limits. Activation of the LEDs associated with each sensor alerts a person within a vicinity of the cable assembly that the cable placement is outside the safety limits. Additionally, in the event cable management program 410 determines a single sensor is faulty in the cable assembly, cable management program 410 can activate the LED associated with the faulty sensor in an orange color. In another embodiment, cable management program 410 sends a notification to a client device (e.g., client device 404) associated with an administrative user. The notification can include an indication that the cable placement of the cable portion of the cable assembly is outside the safety limit. Additionally, the notification can include base measurement readings and a visualization of the cable placement based on the base measurement readings, along with the measurement readings and a visualization of the cable placement outside the safety limits.

Figure 6:
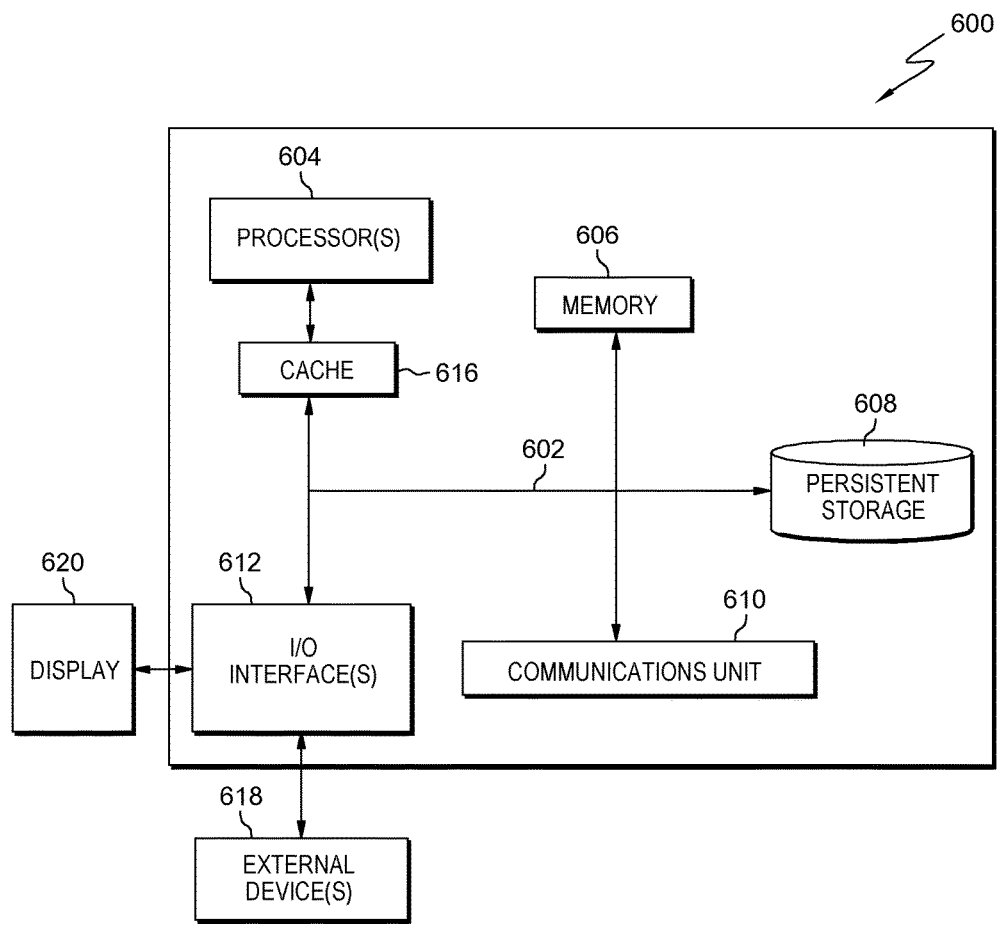
FIG. 6 depicts a block diagram of components of a computer system, such as the client device of FIG. 4, in an embodiment, in accordance with the present invention.

FIG. 6 depicts computer system 600, where embedded microcontroller 412 is an example of a system that includes cable management program 410. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    determining, by one or more processors, a first base reading corresponding to a first sensor and a second base reading corresponding to a second sensor, wherein the first sensor and the second sensor are embedded on a cable portion of a cable assembly;
    responsive to receiving a first reading corresponding to the first sensor and a second reading corresponding to the second sensor, determining, by one or more processors, whether a cable placement of the cable portion of the cable assembly is outside a safety limit;
    responsive to determining the cable placement of the cable portion of the cable assembly is outside the safety limit, sending, by one or more processors, an alert; and
    activating, by one or more processors, a first visual indicator associated with the first sensor and a second visual indicator associated with the second sensor, wherein the first visual indicator and the second visual indicator are embedded in the cable portion of the cable assembly.

2. The method of claim 1, wherein sending an alert comprises:
    sending, by one or more processors, a notification to a client device, wherein the notification includes an indication that the cable placement of the cable portion of the cable assembly is outside the safety limit.

3. The method of claim 2, wherein the notification further includes the first reading and the second reading, and a visualization of the cable placement of the cable portion of the cable assembly outside the safety limits.

4. The method of claim 3, wherein the notification further includes the first base reading and the second base reading and a visualization of the cable placement based on the first base reading and the second base reading.

5. The method of claim 1, wherein determining a first base reading corresponding to a first sensor and a second base reading corresponding to a second sensor further comprises:
    querying, by one or more processors, a microcontroller associated with the first sensor and the second sensor for the first base reading and the second base reading; and
    responsive to receiving the first base reading and the second base reading from the microcontroller, determining, by one or more processors, a visualization of the cable placement based on the first base reading and the second base reading.

6. The method of claim 5, wherein determining a visualization of the cable placement based on the first base reading and the second base reading is based on a slope between the first sensor and the second sensor, wherein the slope is calculated from a length of the cable portion of the cable assembly, a spacing between the first sensor and the second sensor, and the first base reading and the second base reading.

7. The method of claim 1, further comprising:
    determining, by one or more processors, a visualization of the cable placement based on the first reading and the second reading.

8. The method of claim 7, wherein determining a visualization of the cable placement based on the first reading and the second reading is based on a slope between the first sensor and the second sensor, wherein the slope is calculated from a length of the cable portion of the cable assembly, a spacing between the first sensor and the second sensor, and the first base reading and the second base reading.

9. The method of claim 1, wherein determining whether a cable placement of the cable portion of the cable assembly is outside a safety limit comprises:
    determining, by one or more processors, whether a first slope between the first reading and the second reading is outside a threshold range, wherein the threshold range is based on the first base reading and the second base reading.

10. The method of claim 1, wherein a first reading corresponding to the first sensor and a second reading corresponding to the second sensor each include orientation measurements.

11. The method of claim 10, wherein the orientation measurements include at least one of: gravitational force measurements, acceleration measurements, or magnetism measurements.

12. The method of claim 10, wherein a first base reading corresponding to a first sensor and a second base reading corresponding to a second sensor each include orientation measurements.

* * * * *